US006781974B1

United States Patent
Tsumura (10) Patent No.: US 6,781,974 B1
(45) Date of Patent: Aug. 24, 2004

(54) METHOD OF ASSIGNING FREQUENCY USING PROPAGATION LOSS

(75) Inventor: Soichi Tsumura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/324,930

(22) Filed: Jun. 3, 1999

(30) Foreign Application Priority Data

Jun. 9, 1998 (JP) .......................................... 10/160721

(51) Int. Cl.⁷ .............................................. H04Q 7/20
(52) U.S. Cl. ...................... 370/335; 370/342; 370/441; 455/450
(58) Field of Search .................................. 370/320, 330, 370/332, 333, 342, 335, 348, 338, 341, 441; 455/509, 450, 452, 448

(56) References Cited

U.S. PATENT DOCUMENTS

| 5,507,008 A | * | 4/1996 | Kanai et al. ................. 455/512 |
| 5,708,969 A |   | 1/1998 | Kotzin et al. |
| 5,745,484 A | * | 4/1998 | Scott .......................... 370/347 |
| 5,884,181 A | * | 3/1999 | Arnold et al. .............. 455/450 |
| 6,115,368 A | * | 9/2000 | Schilling .................... 370/335 |
| 2002/0009070 A1 | * | 1/2002 | Lindsay et al. ............. 370/347 |
| 2002/0054577 A1 | * | 5/2002 | Gaskill et al. .............. 370/318 |

FOREIGN PATENT DOCUMENTS

| EP | 0544095 | 6/1993 |
| EP | 0782361 | 7/1997 |
| JP | 2-224423 | 9/1990 |
| JP | 4-336822 | 11/1992 |
| JP | 5-110504 | 4/1993 |
| JP | 6-29922 | 2/1994 |
| JP | 6-93649 | 11/1994 |

* cited by examiner

Primary Examiner—Jean Gelin
(74) Attorney, Agent, or Firm—Dickstein, Shapiro, Morin & Oshinsky, LLP.

(57) ABSTRACT

A process of assigning frequencies uses propagation loss in a CDMA communication system. A base station measures propagation loss over a channel between the base station and a mobile station. If the measured propagation loss is greater than a certain fixed value, the base station determines that since the mobile station is present in a position distant from the base station, the mobile station may possibly interfere with a base station of another CDMA communication system. The base station assigns a frequency channel which is not adjacent to the frequency band assigned to the other CDMA communication system to the mobile station.

8 Claims, 7 Drawing Sheets

METHOD OF ASSIGNING FREQUENCY USING PROPAGATION LOSS

BACKGROUND OF THE INVENTION

1. Field of the Invention

The present invention relates to a method of assigning a frequency from a base station to mobile stations in a CDMA (Code Division Multiple Access) communication system.

2. Description of the Related Art

The CDMA communication system is expected to be the next-generation mobile communication system. The CDMA communication system is advantageous in that a plurality of adjacent base stations can share one frequency band.

In a CDMA communication system, different codes are assigned to respective channels, and signals are demodulated on the basis of the fact that there is a difference between autocorrelated values, which are correlated values between the same codes, and cross-correlated values, which are correlated values between different codes. It is therefore necessary that the cross-correlated values between the codes assigned to the respective channels are sufficiently lower than the autocorrelated values. It is most preferable that all the codes which are used be orthogonal to each other (the cross-correlated values be 0). However, since it is difficult for all the codes which are used by base stations that are adjacent to each other to be orthogonal to each other, the cross-correlated values are generally not 0.

If the cross-correlated values are not 0, then there is a possibility that when a mobile station A1 is present near a base station and a mobile station A2 is present far from the base station, depending on the ratio of transmission powers of the mobile stations A1, A2 at the time signals from the mobile stations A1, A2 arrive at the antenna of the base station, the correlated value (cross-corrected value) between the signal from the mobile station A1 and the code assigned to the mobile station A2 may be greater than the correlated value (autocorrelated value) between the signal from the mobile station A2 and the code assigned to the mobile station A2.

In such a case, because the cross-corrected value is not lower than the autocorrelated value, the signal from the mobile station A2 cannot properly be demodulated. This could lead to a fatally dangerous situation where if the signal power sent from one mobile station and received by the antenna of a base station is much greater than the signal power sent from another mobile station and received by the antenna of the base station, then the base station is unable to decode signals other than the signal from the mobile station whose reception power is larger at the antenna of the base station. This problem is widely known as a near-far problem. In order to solve the problem, it is necessary to perform a transmission power control process on transmitters for equalizing signal powers from all the transmitters in input signals received by a receiver.

If a mobile communication system is operated by a sole network operator and a handoff is properly carried out as a mobile station moves, then communications are effected via a path whose transmission loss is smallest between the base station and the mobile station. It is thus possible to perform a transmission power control process in order to minimize the transmission power of the mobile station for thereby solving the near-far problem.

Figure 1:
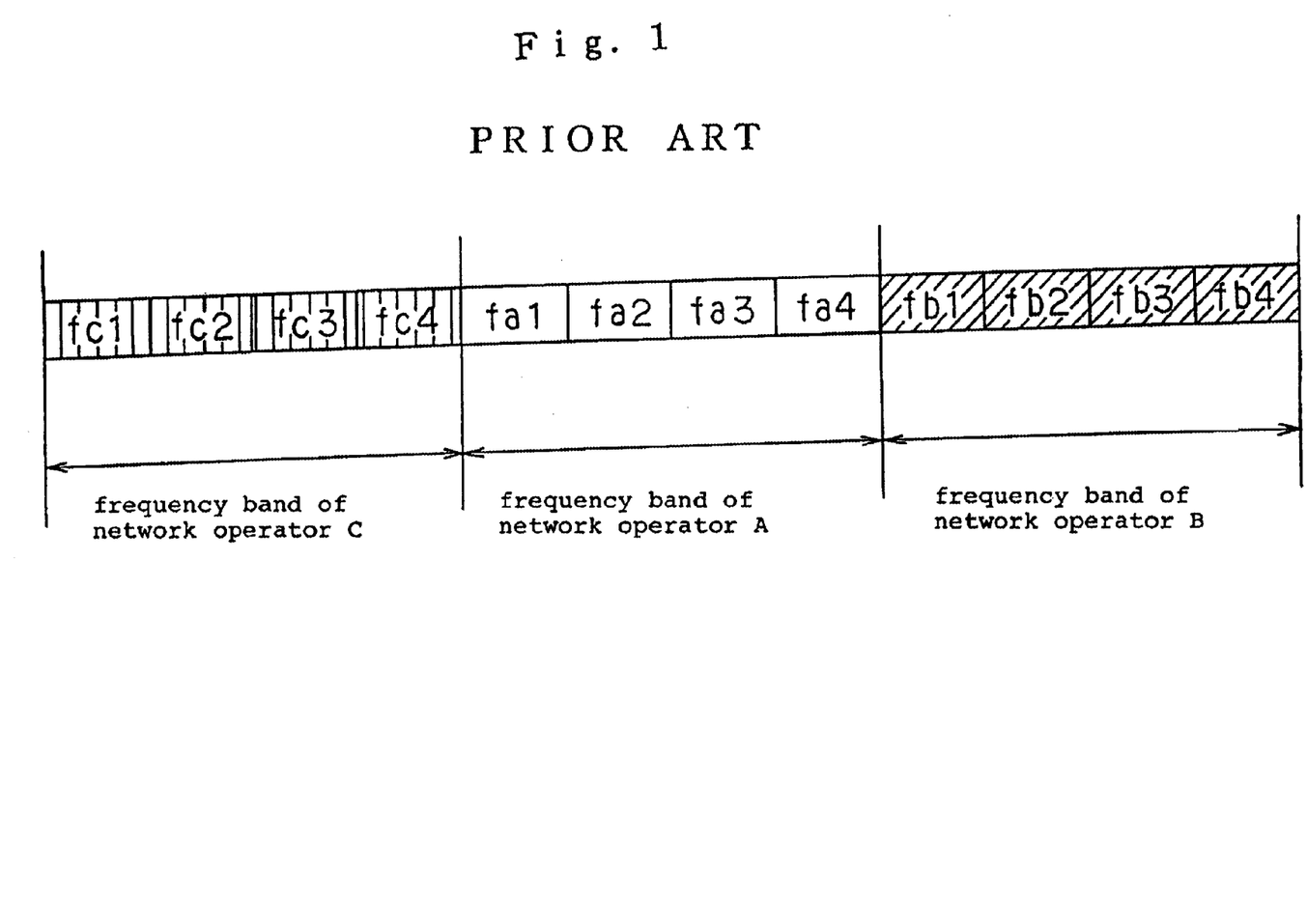
FIG. 1 is a diagram showing the assignment of four frequency channels to each of network operators.

Another problem occurs when a plurality of mobile communications are operated in one area by a plurality of network operators. In this situation, if the base stations are located at one site or mutual roaming is carried out between the different network operators, then no difficulty arises because a path whose transmission loss is smallest between base and mobile stations is practically selected. Since, however, such a solution is generally difficult to achieve, it has been customary to solve the above problem by assigning different frequency bands-to the respective network operators, as shown in FIG. 1 of the accompanying drawings. FIG. 1 shows the assignment of four frequency channels to each of network operators A, B, C.

If the frequency bands assigned to the respective network operators are successive, then in frequency channels located at a boundary between different frequency bands, the leaking power in an adjacent channel of a transmission signal from a mobile station causes a near-far problem to a frequency channel of another network operator. For example, in frequency channels fa1, fa4 located at a boundary of the frequency band assigned to a network operator A, the leaking power in an adjacent channel of a transmission signal from a mobile station causes a near-far problem to a frequency channel fc4 of a network operator C and a frequency channel fb1 of a network operator B.

Figure 2:
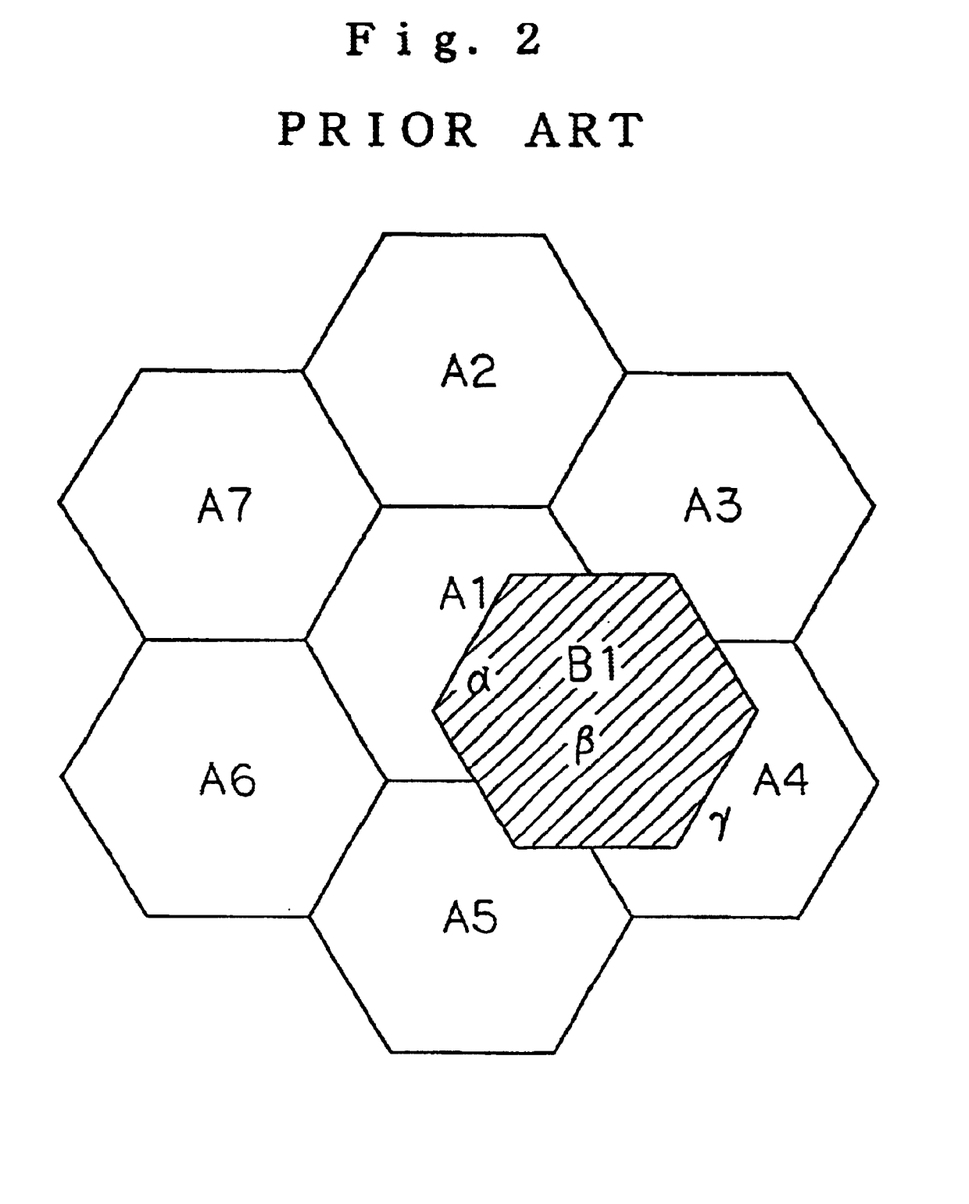
FIG. 2 is a diagram showing cells of conventional CDMA communication systems provided by network operators A, B shown in FIG. 1.

FIG. 2 of the accompanying drawings shows CDMA communication systems provided by a plurality of network operators and located in one area. As shown in FIG. 2, two network operators A, B provide respective CDMA communication systems in one area. The CDMA communication system provided by the network operator A has base stations (not shown) which communicate with mobile stations present in cells A1–A7. It is assumed that the cells A1–A7 overlap a cell B1 of a base station of the CDMA communication system provided by the network operator B, and that the frequency channels shown in FIG. 1 are assigned to each of the network operators A, B.

In FIG. 2, $\alpha$ represents the position of the base station of the cell A1, $\beta$ represents the position of the base station of the cell B1, and $\gamma$ represents the position of the base station of the cell A4.

In order to solve a near-far problem in one CDMA communication system, each of the base stations control the transmission powers of mobile stations linked thereto, and the reception powers at the antenna of each of the base stations are controlled at a constant level at all times irrespective of the positions of the mobile stations. Specifically, if the distance between a mobile station and a base station linked thereto is large, then the transmission power of the mobile station is increased, and if the distance between a mobile station and a base station linked thereto is small, then the transmission power of the mobile station is reduced.

In FIG. 2, when a mobile station belonging to the CDMA communication system provided by the network operator A moves from the position $\alpha$ to the position $\beta$ to the position $\gamma$, the transmission power of the mobile station is first progressively increased from a low level to a maximum level at the position $\beta$. Near the position $\beta$, a handoff takes place from the base station of the cell A1 to the base station of the cell A4. As the mobile station approaches the position $\gamma$, the transmission power of the mobile station is gradually lowered.

Figure 3A:
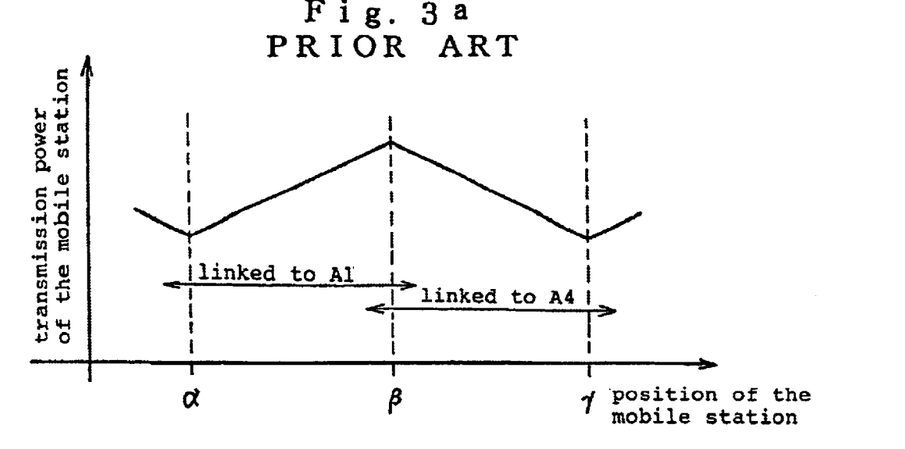
FIG. 3a is a graph showing the manner in which the transmission power of a mobile station changes in the conventional CDMA communication systems changes.

The transmission power of a mobile station in the cell A1 which uses the frequency channel fa4 changes as shown in FIG. 3a of the accompanying drawings. The reception power at the base station of the cell A1 in the position a and the reception power at the base station of the cell A4 in the position $\gamma$ change as shown in FIG. 3b of the accompanying drawings.

Figure 3B:
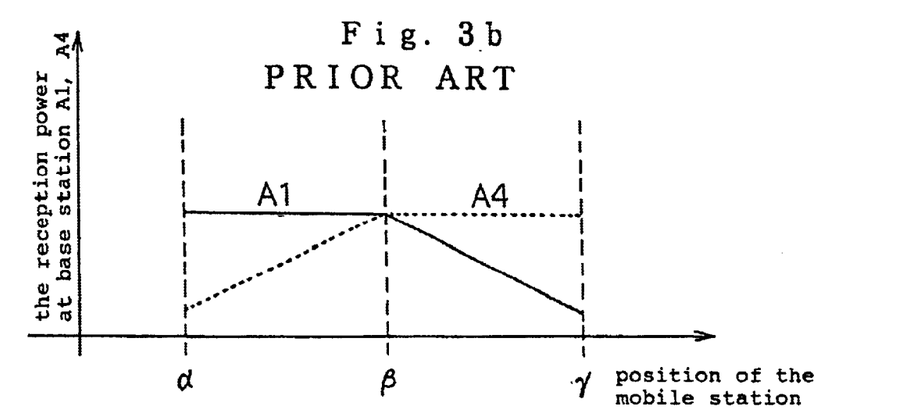
FIG. 3b is a graph showing the manner in which the reception powers in the base stations of cells A1, A4 in the conventional CDMA communication systems change.

As shown in FIG. 3b, when the mobile station is located between the position α and the position β, the reception power at the base station of the cell A1 is constant, and when the mobile station is located between the position β and the position γ, the reception power at the base station of the cell A1 is gradually reduced. The reception power at the base station of the cell A4 is gradually increased when the mobile station is located between the position α and the position β, and is constant when the mobile station is located between the position β and the position γ. When the reception powers are constant, the reception powers have the same level at the base stations of the cells A1, A4. At this time, the reception power in the frequency channel fb1 of the base station in the position β of the cell B1 of the network operator B is indicated by the solid-line curve in FIG. 3c of the accompanying drawings because of the leaking power in an adjacent channel from a mobile station. The conventional CDMA communication system has strict standards for the leaking power in an adjacent channel with respect to a transmitted signal from a mobile station, so that any interference which occurs with the base station of the cell when the mobile station is in the position β can be reduced to a level low enough not to cause practical problems to the CDMA communication system.

Figure 3C:
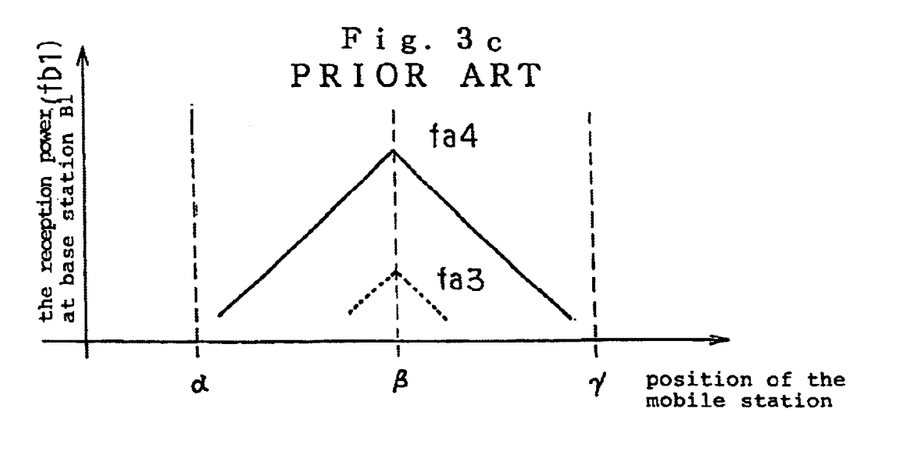
FIG. 3c is a graph showing the manner in which the reception power in the frequency channel fb1 of the base station of a cell B1 in the conventional CDMA communication systems changes.

The reception power in the frequency channel fb1 in the base station of the cell B1 at the time the mobile station has a transmission frequency channel fa3 is indicated by the dotted-line curve in FIG. 3c. The reception power in the frequency channel fb1 is low because the leaking power is exponentially reduced as the reception frequency channel is away from the transmission frequency channel.

As described above, the conventional CDMA communication system has strict standards for the leaking power in an adjacent channel with respect to a transmitted signal from a mobile station so as to solve the near far problem. Therefore, the transmitters of the mobile stations, particularly the final-stage power amplifiers thereof, are required to have a a high level of linearity, and hence have a large consumption power requirement and an increase in size.

SUMMARY OF THE INVENTION

It is an object of the present invention to provide a method of assigning a frequency from a base station to mobile stations in a CDMA communication system for solving a nearfar problem without strict. standards for the leaking power in an adjacent channel with respect to the transmitter of a mobile station and for reducing a consumption power requirement and size of base stations.

To achieve the above object, in a method of assigning a frequency in a CDMA communication system according to the present invention, a base station measures a propagation loss over a channel between the base station and a mobile station. If the measured propagation loss is greater than a certain fixed value, then the base station determines that since the mobile station is present in a position distant from the base station, the mobile station may possibly interfere with a base station of another CDMA communication system. The base station assigns a frequency channel which is not adjacent to the frequency band assigned to the other CDMA communication system, to the mobile station which may possibly interfere with a base station of another CDMA communication system. Therefore, it is possible to reduce interference with a base station belonging to another network operator, without strict standards for the leaking power in an adjacent channel of a transmitted signal of a mobile station. Therefore, the consumption power requirement and size of the transmitter of the mobile station can be reduced.

In another method of assigning a frequency in a CDMA communication system according to the present invention, a frequency channel which is not adjacent to the frequency band assigned to another CDMA communication system is assigned to a mobile station whose transmission power level is greater than a certain fixed value.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

1st Embodiment

Figure 4:
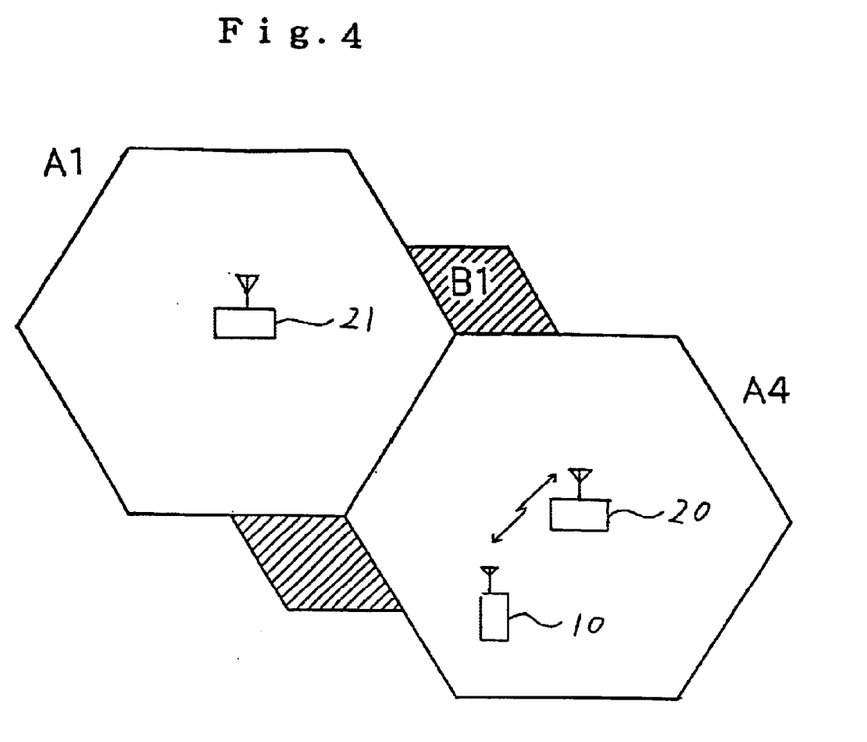
FIG. 4 is a diagram showing a CDMA communication system according to a first embodiment of the present invention.

As shown in FIG. 4, a CDMA communication system according to a first embodiment of the present invention has a mobile station 10 and a pair of base stations 20, 21. The base station 20 communicates with mobile stations in a cell A4, and the base station 21 communicates with mobile stations in a cell A1. For example, the mobile station 10 moves in the cell A4, and hence communicates with the base station 20.

Figure 5:
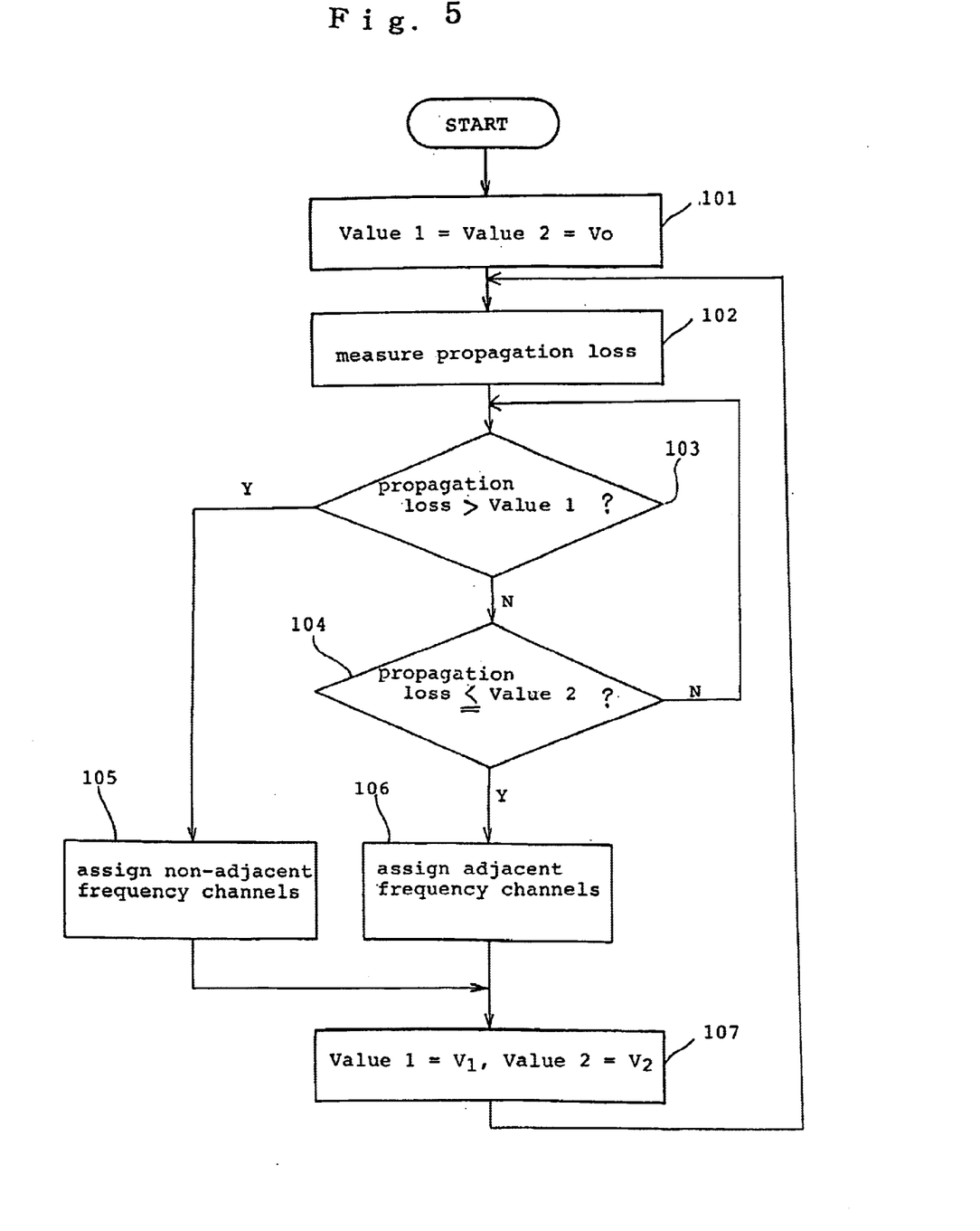
FIG. 5 is a flowchart of a process of assigning a frequency in the CDMA communication system shown in FIG. 4.

A process of assigning a frequency in the CDMA communication system shown in FIG. 4 will be described below with reference to FIG. 5.

At first, in step 101, value 1 and value 2 are set to $V_0$. In step 102, a base station measures a propagation loss in a channel established between the base station and each of the mobile stations. The base station can obtain a propagation loss by calculating the difference between a transmission power level of each of the mobile stations, which transmission power level is reported therefrom, and a reception power level of a signal received from each of the mobile stations by the base station. The base station can also obtain a propagation loss by calculating the difference between a reception power level of a signal received from the base station by each of the mobile stations, which reception power level is reported from the mobile station, and a transmission power level of the base station for each of the mobile stations.

In step 103, the base station decides whether the propagation loss with respect to a mobile station is greater than value 1 or not. If the propagation loss is greater than value 1 in step 103, then the base station assigns a frequency channel which is not adjacent to a frequency channel assigned to another CDMA communication system, to the mobile station in step 105. If the propagation loss is equal to or smaller than value 1 in step 103, the base station decides whether the propagation loss with respect to a mobile station is equal to or smaller than value 2 or not in step 104. If the propagation loss is greater than value 2 in step 104, the process is forwarded to step 103.

If the propagation loss is equal to or smaller than value 2 in step 104, then the base station preferentially assigns a frequency channel which is adjacent to a frequency channel assigned to another CDMA communication system, to the mobile station in step 106. Finally, in step 107, value 1 is set to $V_1$ and value 2 is set to $V_2$, then process is forwarded to step 102.

The process of assigning a frequency in the CDMA communication system will be described in specific detail below with reference to FIG. 6.

As described above, the base station measures a propagation loss in a channel established between the base station and each of the mobile stations. Based on the measured propagation loss, the base station divides the mobile stations present in its own area into a plurality of groups. In FIG. 6, the mobile stations are divided into two groups. While the mobile stations are shown as being grouped based on their positions in FIG. 6, the mobile stations are actually grouped based on the propagation loses.

Figure 6:
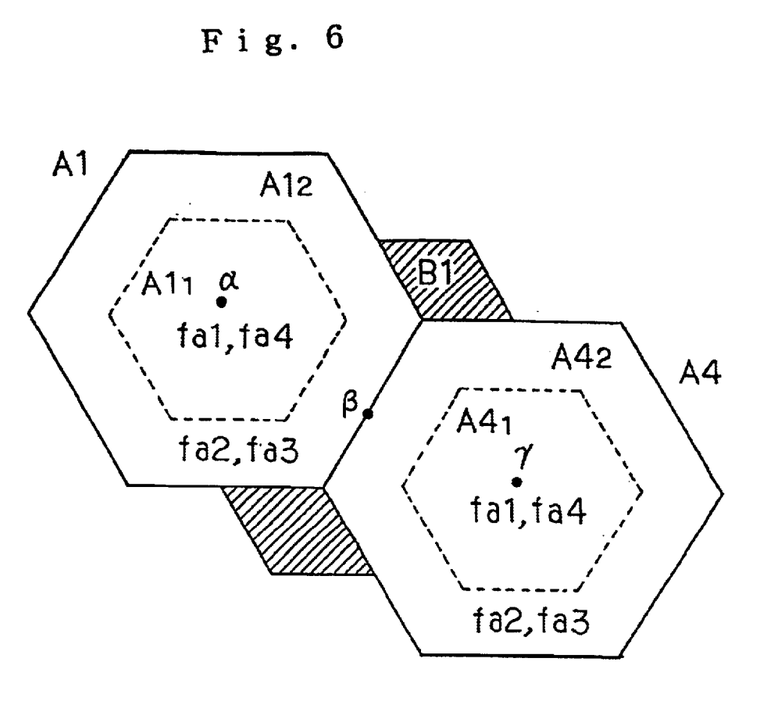
FIG. 6 is a diagram showing cells of the CDMA communication system shown in FIG. 4.

In FIG. 6, the mobile stations in the cell A1 are divided into a group $A1_1$ and a group $A1_2$, and the mobile stations in the cell A4 are divided into a group $A4_1$ and a group $A4_2$. The mobile stations whose propagation losses are equal to or smaller than a value are classified into the group $A1_1$ or $A4_1$, and the mobile stations whose propagation losses are greater than the value are classified into the group $A1_2$ or $A4_2$.

The mobile stations belonging to the groups $A1_2$, $A4_2$ are assigned a frequency channel fa2 or fa3 in FIG. 1 which is not adjacent to a frequency channel assigned to another network operator from among the frequency channels assigned to the CDMA communication system. The mobile stations belonging to the groups $A1_1$, $A4_1$ are preferentially assigned a frequency channel fa1 or fa4 which is adjacent to a frequency channel assigned to another network operator.

In the CDMA communication system according to the present embodiment, when a mobile station moves from a position α, to a position γ, the following frequency channel assignment is performed.

When the mobile station is in the position α, the base station of the cell A1 handles the mobile station as belonging to the group $A1_2$, and preferentially assigns the frequency channel fa1 or fa4 to the mobile station. When the mobile station moves and its propagation loss becomes greater than the value, the base station of the cell A1 classifies the mobile station into the group $A1_2$, and changes the frequency channel being used to fa2 or fa3. When the mobile station further moves to the position β, a handoff occurs from the base station of the cell A1 to the base station of the cell A4. At this time, the frequency channel being used is not changed and base station of the cell A4 handles the mobile station as belonging to group $A4_2$. When the mobile station further moves and its propagation loss as measured by the base station of the cell A4 becomes lower than the value, the base station of the cell A4 handles the mobile station as belonging to the group $A4_1$, and preferentially changes the frequency channel being used to fa1 or fa4.

Figure 7:
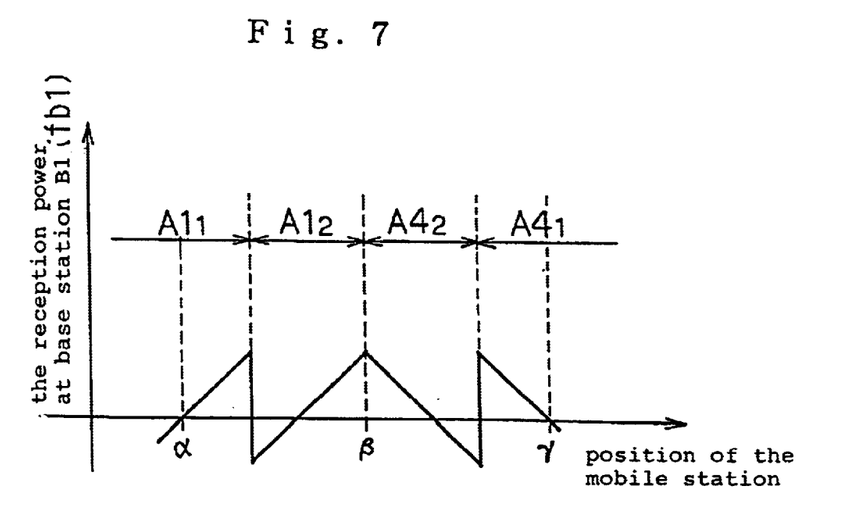
FIG. 7 is a graph showing the manner in which the reception power in the frequency channel fb1 of the base station of a cell B1 in the CDMA communication system shown in FIG. 4 changes.

The above frequency channel assignment, as shown in FIG.7, makes it possible to reduce an upper limit for the reception power in the frequency channel fb1 in the base station of a cell B1 of a network operator B at the position β, to a level lower than the interference power indicated by the solid-line curve in FIG. 3c.

2nd Embodiment

In the first embodiment, a group to which a mobile station belongs is determined on the basis of a propagation loss over a channel with the mobile station, as measured by the base station. According to the second embodiment, a group to which a mobile station belongs is determined on the basis of the transmission power level of the mobile station, rather than a propagation loss. According to a transmission power control process carried out on the mobile station by the base station, the transmission power of the mobile station is controlled so as to be greater if the propagation loss is greater, and the transmission power of the mobile station is controlled so as to be smaller if the propagation loss is smaller. Therefore, the second embodiment can offer the same advantages as the first embodiment even though it employs the transmission power level of the mobile station.

Figure 8:
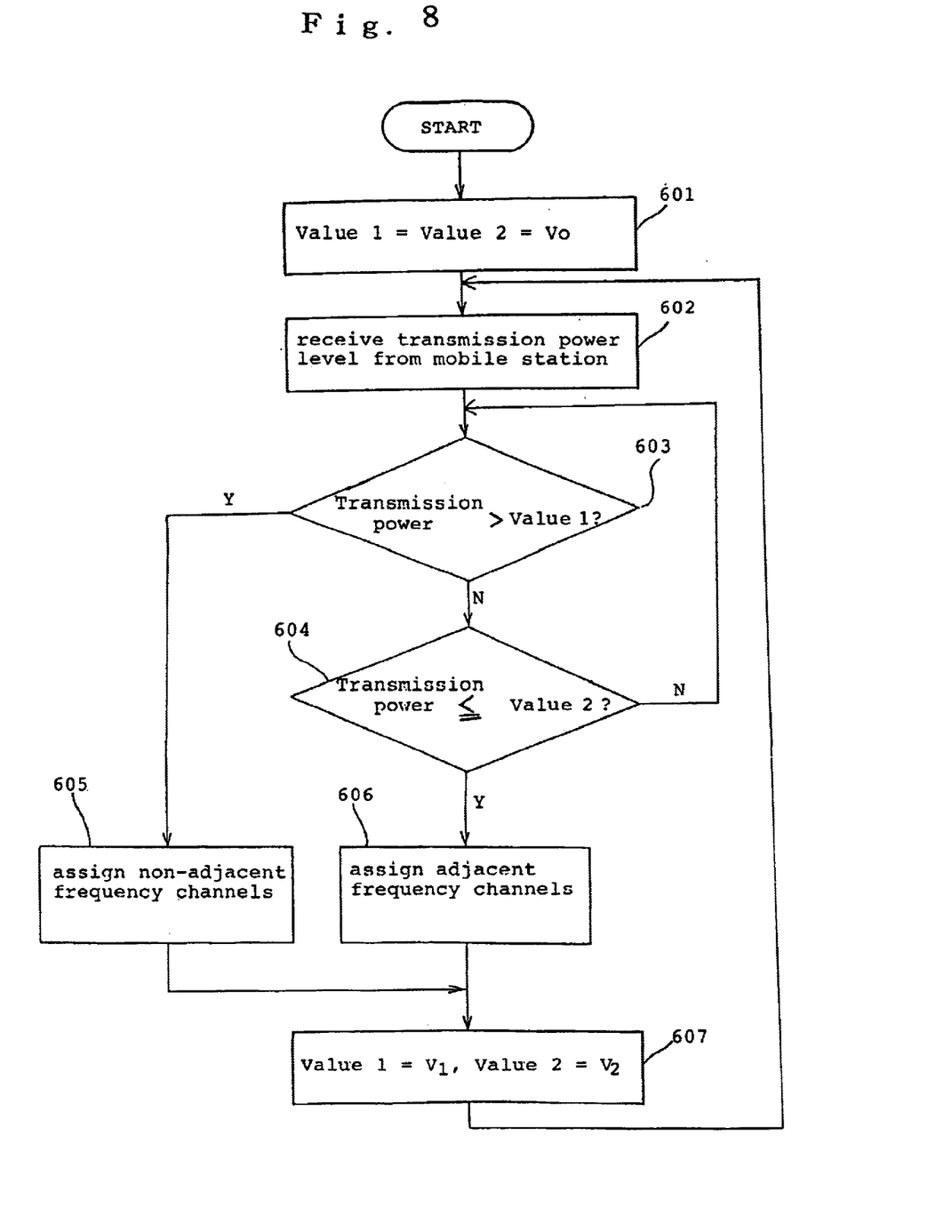
FIG. 8 is a flowchart of a process of assigning a frequency in a CDMA communication system according to a second embodiment of the present invention.

A process of assigning a frequency in the CDMA communication system according to the second embodiment will be described below with reference to FIG. 8.

At first, in step 601, value 1 and value 2 are set to $V_0$. In step 602, a base station receives a transmission power level from a mobile station. The base station decides whether the transmission power level is greater than value 1 or not in step 603. If the transmission power level is greater than value 1 in step 603, then the base station assigns a frequency channel which is not adjacent to a frequency channel assigned to another CDMA communication system, to the mobile station in step 605. If the transmission power level is equal to or smaller than value 1 in step 603, the base station decides whether the transmission power level is equal to or smaller than value 2 or not in step 604. If the transmission power level is greater than value 2 in step 604, then the process is forwarded to step 603.

If the transmission power level is equal to or smaller than value 2 in step 604, then the base station preferentially assigns a frequency channel which is adjacent to a frequency channel assigned to another CDMA communication system, to the mobile station in step 606. Finally, in step 607, value 1 is set to $V_1$ and value 2 is set to $V_2$, then process is forwarded to step 602.

In the first and second embodiments described above, the mobile stations in one cell are divided into two groups. However, the principles of the present invention are also applicable to CDMAM communication systems where the mobile stations in one cell are divided into more than two groups.

Although certain preferred embodiments of the present invention have been shown and described in detail, it should be understood that various changes and modifications may be made therein without departing from the scope of the appended claims.

What is claimed is:

1. A method of assigning frequencies where at least a first and a second CDMA communication system provide services in the same area, where different frequency bands are assigned to each CDMA communication system in which a base station of the first CDMA communication system selects a frequency channel to be used from the respective assigned frequency band and assigns the selected frequency channel to a mobile station, comprising the steps of:

measuring a propagation loss over a channel between said base station and said mobile station present in a cell of said base station;

assigning a frequency channel which is not adjacent to the frequency band assigned to the second CDMA communication system from among the frequency channels assigned to said first CDMA communication system to the mobile station if the propagation loss is greater than a first value; and assigning a frequency channel which is adjacent to the frequency band assigned to the second CDMA communication system from among the frequency channels assigned to said first CDMA communication system to the mobile station if the propagation loss is equal to or smaller than a second value.

2. A method according to claim 1, wherein said step of measuring a propagation loss comprises the step of:

measuring the difference between the transmission power level of said mobile station reported to said base station and the reception power level of a signal transmitted from said mobile station and received at said base station.

3. A method according to claim 1, wherein said step of measuring a propagation loss comprises the step of:

measuring the difference between the reception power level at the mobile station of a signal from said base station, reported from said mobile station to said base station, and the transmission power level of said base station to the mobile station.

4. A method of assigning frequencies where at lest a first and a second CDMA communication system provide services in the same area, where different frequency bands are assigned to each CDMA communication system in which a base station of the first CDMA communication system selects a frequency channel to be used from the respective assigned frequency band and assigns the selected frequency channel to a mobile station, comprising the steps of:

indicating the transmission power level of the mobile station from the mobile station to the base station;

assigning a frequency channel which is not adjacent to the frequency band assigned to the second CDMA communication system from among the frequency channels assigned to said first CDMA communication system, to the mobile station if the transmission power level is greater than a first value; and assigning a frequency channel which is adjacent to the frequency band assigned to the second CDMA communication system from among the frequency channels assigned to said first CDMA communication system to the mobile station if the transmission power level is equal to or smaller than a second value.

5. A CDMA communication system comprising:

at least one mobile station; and a plurality of base stations, a particular base station measures a propagation loss over a channel with said mobile station present in a cell of the particular base station, assigns a frequency channel which is not adjacent to the frequency band assigned to another CDMA communication system which provides services in the same area as the CDMA communication system from among the frequency channels assigned to said CDMA communication system to the mobile station if the propagation loss is greater than a first value, and assigns a frequency channel which is adjacent to the frequency band assigned to the other CDMA communication system from among the frequency channels assigned to said CDMA communication system, to the mobile station when the propagation loss is equal to or smaller than a second value.

6. A CDMA communication system according to claim 5, wherein the mobile station measures said propagation loss based on the difference between the transmission power level of the mobile station reported from said mobile station to said particular base station, and the reception power level of a signal transmitted from said mobile station and received at said particular base station.

7. A CDMA communication system according to claim 5, wherein the mobile station measures said propagation loss based on the difference between the reception power level at the mobile station of a signal from said base station, reported from said mobile to said base station, and the transmission power level of said base station to the mobile station.

8. A CDMA communication system comprising:

at least one mobile station which indicates a transmission power level to a base station; and a plurality of base stations, a particular base station assigns a frequency channel which is not adjacent to the frequency band assigned to another CDMA communication system which provides services in the same area as the CDMA communication system from among frequency channels assigned to the CDMA communication system to the mobile station if the transmission power level is greater than a first value, and assigns a frequency channel which is adjacent to the frequency band assigned to the other CDMA communication system from among the frequency channels assigned to said CDMA communication system to the mobile station if the transmission power level is equal to or smaller than a second value.

* * * * *